Patented Dec. 4, 1951

2,577,281

UNITED STATES PATENT OFFICE 2,577,281

FLAME RETARDANT CELLULAR PLASTIC MATERIAL

Eli Simon, Los Angeles, and Frank W. Thomas, Burbank, Calif., assignors to Lockheed Aircraft Corporation, Burbank, Calif.

No Drawing. Application October 15, 1948, Serial No. 54,822

25 Claims. (Cl. 260—2.5)

This invention relates to cellular plastic materials and relates more particularly to formulations and methods for making flame resistant and self-extinguishing cellular plastics.

In our copending applications, Serial No. 35,294, filed June 25, 1948; Serial No. 44,993, filed August 18, 1948; and Serial No. 50,007, filed September 18, 1948, we have disclosed methods and formulations for making low density cellular plastics characterized by the ease and simplicity with which the foamed or cellular plastics are produced. The earlier conventional methods for making foamed plastics and rubbers were complicated, time consuming and required the employment of extensive, costly equipment. Further, with the older methods it was not possible to directly introduce the material into a space or cavity to polymerize therein and directly bond with or adhere to its walls to form a permanent part, lamination or element of a structure, but it was necessary to first prepare and form the cellular material and then install it in the intended final position. Typical examples of the prior methods employed in the production of cellular materials are (1) the solution of a gas in an undercured rubber which is held under high pressure with the slow controlled release of the pressure while subjecting the rubber to vulcanizing temperatures; and (2) the incorporation of foaming agents in heat sensitive plastics with the subsequent subjection of the plastics to heat and pressure with a controlled release of such pressure.

The procedures and formulations disclosed in our copending applications above referred to, completely avoid the difficulties experienced with the earlier methods and are such that the plastic material components are simply mixed together and poured into the cavity and then allowed to react at atmospheric pressure to directly and finally bond with the surfaces and to assume its ultimate cellular condition. This we accomplished by employing an alkyd resin-polyisocyanate mixture as the plastic component and obtaining a particularly effective foam-producing action at atmospheric pressure by controlling the water content of the resin, by incorporating water as a foaming component either through the use of a metallic salt hydrate or in conjunction with a non-ionic wetting agent, or by incorporating metallic leafing powder or metallic soap powder, or both, in the alkyd resin-poly-isocyanate mixture. The resultant material has a low density, high strength, and maintains a strong permanent bond or adhesion with the surfaces to which it is applied. These characteristics of the material and the ease with which it may be applied or poured well suit it for use in structures and assemblies of various kinds.

The present invention has to do with the incorporation of fire retardants in alkyd resin-polyisocyanate reactant mixtures of the character above referred to which, in addition to other functions, render the cellular plastics flame resistant and self-extinguishing. It is accordingly, a general object of the present invention to provide formulations and a simple inexpensive and commercially practical method for producing flame resistant cellular products.

Isocyanates are reactive molecules which form addition products with labile or active hydrogen atoms. As an illustration, an isocyanate, such as $R-N=C=O$, where R represents an alkyl or aryl group, reacts with an alcohol, such as ethyl alcohol, to form a urethane as an addition product. Thus

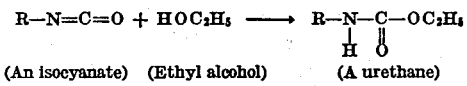

(An isocyanate) (Ethyl alcohol) (A urethane)

When a di-isocyanate is used, a bi-functional molecule is available which can serve as a polymerizing agent when reacted with another molecule containing more than one functional group, each group having at least one active or labile hydrogen atom. Thus:

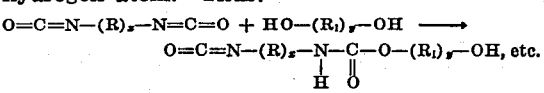

where $(R)_x$ and $(R_1)_y$ represent intervening structure between the terminal functional groups.

The above reaction will theoretically produce a large molecule that is always thermoplastic or heat sensitive because the polymer is predominantly linear and although there may be some branching, the molecule still remains a single macro-molecule isolated from surrounding molecules as far as chemical covalent bonds are concerned so that its motion is not limited or its position with relationship to other molecules fixed. A more rigid and less heat-sensitive resin can be formed if some molecules are introduced having more than two functional groups, each group containing at least one reactive hydrogen atom. Thus, if an alkyd type resin is formed by reacting glycerol, which is tri-functional, with adipic acid, which is bi-functional, to a stage corresponding roughly to a "B" stage resin, the resultant syrupy resin can quickly be taken to the final stage of resinification where it is rigid, insoluble and less heat sensitive, by reacting it with a di-isocyanate, such as meta toluene di-isocyanate through a process of polymerization or addition reaction, the labile hydrogen atoms of the free OH groups of the alkyd resin molecule adding to the isocyanate molecule producing a cross-linked three dimensional molecule. Molecules of three dimensional extension have restricted and finally arrested motion. Thus, a gel formation in polymerization does not necessarily depend upon the production of giant molecules but may occur if there is a sufficiently high concentration of cross-linked three dimensional molecules having only a comparatively low degree of polymerization.

In accordance with this method, we employ alkyd resins or the reaction products of polyhydric alcohols and polybasic acids unmodified or modified with oils and/or other resins, and having the following ratios of hydroxyl groups to carboxyl groups in the alkyd resin reactants:

From 3 hydroxyl (OH) : carboxyl (COOH)
To 4 hydroxyl (OH) : 5 carboxyl (COOH)

A resin of this character is reacted with a poly-isocyanate, a selected proportion of a metallic soap powder or a metallic leafing powder, or a selected proportion of a metallic soap powder and a metallic leafing powder, the metallic soap powder, or leafing powder, or the mixture of the metallic soap powder and metallic leafing powder being added to the reactant mixture to produce a low density cellular plastic of superior characteristics.

A practical low density cellular plastic of good physical characteristics may also be prepared by incorporating the foaming component water in the alkyd resin-di-isocyanate mixture through the use of a metallic salt hydrate that is soluble in anhydrous ethyl alcohol at approximately 18° C. to the extent of at least 1½ grams of the salt to 100 cc. of the solvent, or by the employment of a combination of a non-ionic wetting agent and the water in an appropriate concentration.

It is an object of the present invention to provide a method for producing light-weight foamed plastic materials by employing alkyd resin-poly-isocyanate formulations of the classes above referred to and further incorporating addition agents which impart flame proof characteristics to the cellular materials and which decrease or inhibit flame propagation of the foamed plastics if the same become ignited. We have discovered that certain unsaturated alkyl esters or aryl phosphonic acids incorporated in the reactant alkyd resin-poly-isocyanate mixture in appropriate proportions, render the resultant cellular plastic materials flame resistant and decrease or inhibit flame propagation of the foamed plastic if the same become ignited.

Another object of the invention is to provide a method and formulation for producing flame resistant cellular plastics wherein the additive for rendering the product flame resistant also acts to materially decrease the density of the plastic. It would ordinarily be expected that the inclusion of the flame resistant additive to a given quantity of a known alkyd resin-poly-isocyanate mixture would increase the density of the foamed product, however, we have discovered the reverse to be the case and the inclusion of a selected unsaturated alkyl ester of an aryl phosphonic acid in a proper portion in a given quantity of the alkyd resin-poly-isocyanate mixture actually substantially increases the volume, that is decreases the density, of the resultant cellular product.

Another object of the invention is to provide a method and formulation of the class referred to wherein the additives for rendering the foamed plastic flame resistant, do not remain as permanent plasticizers in the foamed plastic material. By adding a peroxide-type catalyst such as benzoyl peroxide to the additives, they may be hardened or polymerized during the foaming reaction and post curing of the alkyd-resin-poly-isocyanate mixture without losing their effectiveness as flameproofing and fire retardant agents. Thus the benefits of plasticization and viscosity control are utilized during the foaming reaction without the penalty of decreased heat stability of the cellular plastic due to permanent plasticization.

It is a further object of the invention to provide formulations for the production of foamed or cellular plastics wherein the additives for imparting the flame resistant properties to the products serve as mutual solvents for both the poly-isocyanate and the alkyd resin, facilitating the mixing operation and reducing the mixing time thereby permitting the use of resins of higher water content to avoid premature reaction of the mixture during the mixing and pouring operations, and thus lowering the density of the cellular plastic products.

The method of the invention comprehends generally, the preparation or mixing of an alkyd resin, a poly-isocyanate, and a metallic soap powder or a metallic leafing powder, or instead of the metallic soap powder and/or the metallic leafing powder, a metallic salt hydrate or water in conjunction with a non-ionic wetting agent, and addition agents which act as fire retardants, the mixture being poured and allowed to react at atmospheric pressure with or without the application of external heat and with or without a post-curing at slightly elevated temperatures.

The resins which we employ in the formulation and method are the reaction products of polyhydric alcohols and polybasic acids unmodified or modified with oil and/or other resins, having an acid number of from 5 to 80 and having the following ratio range of the hydroxyl groups to the carboxyl groups in the reactants of the resin:

From 3 hydroxyl (OH) : 1 carboxyl (COOH)
To 4 hydroxyl (OH) : 5 carboxyl (COOH)

We have found that in practice it is preferred to employ resins having an acid number between approximately 10 and approximately 25 and wherein the ratio of the hydroxyl groups to the carboxyl groups is 2:1 although satisfactory results have been obtained by employing resins having the foregoing ranges of acid numbers and ratios of the hydroxyl and carboxyl groups of their reactants. The following formula has been found to be suitable for preparing unmodified alkyd resins from a polyhydric alcohol and polybasic acids, yielding a resin having an acid number of from 5 to 80, preferably approximately 15, and a water content of about 0.3% by weight:

FORMULA A

| | Mols |
|---|---|
| Glycerol | 4 |
| Adipic acid | 2.5 |
| Phthalic anhydride | 0.5 |

An alkyd resin of Formula A is mixed with the di-isocyanate and the metallic soap powder or the metallic soap powder and a metallic leafing powder, or the metallic salt hydrate or the water and non-ionic wetting agent, and the flame proofing additive, to produce a foamed or cellular plastic, the density of the product being controlled by the water content of the resin, the acid number of the resin, the percentage or proportion of the filler employed, etc. Formula A may, if desired, be modified by employing from 3 to 5 mols of glycerol, from 1.5 to 3 of adipic acid, and from 0.1 to 1.5 mols of phthalic anhydride. The ingredients of Formula A are reacted in an open vessel to have the selected acid number of from 5 to 80 and the selected water content of from 0.1% to 2.5% by weight. Other unmodified alkyd resins prepared from polyhydric alcohols and polybasic acids which are practical and effective in preparing the cellular plastic of the invention are:

FORMULA B

| | Mols |
|---|---|
| Glycerol | 2 |
| 1,4 butylene glycol | 1 |
| Adipic acid | 2 |

FORMULA C

| | Mols |
|---|---|
| Trimethylol propane | 4 |
| Adipic acid | 2.5 |
| Phthalic anhydride | 0.5 |

FORMULA D

| | Mols |
|---|---|
| Glycerol | 2 |
| Pentaerithritol | 0.5 |
| Phthalic anhydride | 1 |
| Sebacic acid | 3 |

The ratios of the hydroxyl groups to the carboxyl groups in Formulae A, B, C and D are respectively 2(OH):1(COOH),

2(OH):1(COOH), 2(OH):1(COOH)

and 1(OH):1(COOH).

The following Formulae E, F and G are typical or representative of formulae that may be employed in preparing unmodified alkyd resins from single polyhydric alcohols and single polybasic acids suitable for use in the method and products of the invention:

FORMULA E

| | Mols |
|---|---|
| Glycerol | 4 |
| Adipic acid | 3 |

FORMULA F

| | Mols |
|---|---|
| Trimethylol propane | 3 |
| Phthalic anhydride | 2 |

FORMULA G

| | Mols |
|---|---|
| Glycerol | 1 |
| Phthalic anhydride | 1.5 |

The respective ratios of the hydroxyl groups to carboxyl groups of Formulae E, F and G are 2(OH):1(COOH), 9(OH):4(COOH) and
1(OH):1(COOH)

Examples of alkyd resins, oil modified that have been found to be practical and operative in preparing the cellular plastic materials in accordance with the invention are found in Formulae H and I where the ratio of the hydroxyl groups to the carboxyl groups in the reactants are 3(OH):3½(COOH) and 6(OH):7(COOH) respectively.

FORMULA H

| | Mols |
|---|---|
| Glycerol | 1 |
| Phthalic anhydride | 1.5 |
| Oleic acid | 0.5 |

FORMULA I

| | Mols |
|---|---|
| Diethylene glycol | 5 |
| Adipic acid | 5 |
| Citric acid | 1 |
| Lactic acid | 1 |

Another example of an oil modified alkyd resin which we have found to be effective in preparing the cellular plastic is set forth in Formula J where the ratio of the hydroxyl and carboxyl groups in the resin reactants is 10(OH):9(COOH) where the (OH) group in the ricinoleic acid or the 3(OH) groups for the castor oil molecule is taken into account or 7½(OH):9(COOH) when the (OH) groups in the ricinoleic acid is not considered.

FORMULA J

| | Mols |
|---|---|
| Glycerol | 2.5 |
| Adipic acid | 4 |
| Castor oil | 1 |
| Maleic anhydride | ½ |

An example of a natural resin modified alkyd resin suitable for use in the method and cellular products of the invention is found in Formula K where the ratio of the hydroxyl to the carboxyl groups of the alkyd resin reactants is

1(OH):1(COOH)

FORMULA K

| | | |
|---|---|---|
| Glycerol | gram mols | 1 |
| Sebacic acid | do | 1½ |
| Resin copal | grams | 100 |

An example of a synthetic resin modified alkyd resin adapted for use in the formulations and method of the invention is set forth below in Formula L where the ratio of the hydroxyl groups to carboxyl groups of the alkyd resin reactants is 3(OH):2(COOH).

FORMULA L

| | |
|---|---|
| Phenol | 50 grams |
| Formaldehyde | 17 grams |
| Rosin | 65 grams |
| Phthalic anhydride | 30 grams or 0.2 gram mol |
| Glycerol | 18.4 grams or 0.2 gram mol |

The isocyanate which is reacted with the selected alkyd resin in the production of the cellular or foamed plastic, is a poly-isocyanate such as meta toluene di-isocyanate. The di-isocyanate is employed in the proportion of approximately 35 to approximately 150 parts by weight to 100 parts by weight of the alkyd resin, depending upon the quantity of the water present in the resin component and employed with the metallic salt hydrate or with the non-ionic wetting agent, the acid number of the resins and the type and quantity of the metallic soap powder or the amount of the metallic soap powder and/or metallic leafing powder used.

Some reactions between an isocyanate and water are represented by the following in which R may be either an alkyl or aryl group:

1

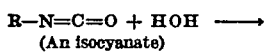
(An isocyanate)

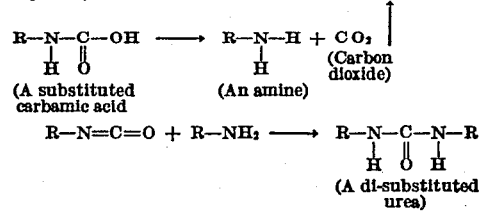

2

R—N=C=O + HOH ⟶ R—N—C—OH ⟶
(An isocyanate)   (A substituted carbamic acid)

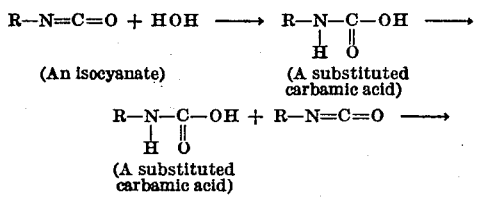
(A substituted carbamic acid)

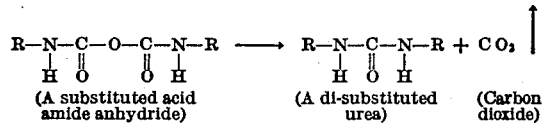

As described and claimed in our copending application Serial No. 50,007, the incorporation of a selected proportion of a metallic soap powder in the alkyd resin di-isocyanate produces results greatly superior than those obtainable by reacting the alkyd resin and the di-isocyanate alone. The addition of a suitable proportion of a metallic soap powder or a metallic soap powder and a metallic leafing powder in the alkyd resin di-isocyanate mixture produces a cellular plastic having a much lower density, a greatly increased volume, more uniform and symmetrical cells, and possessing greater strength. For example, if 30 grams of the alkyd resin of Formula A, having an acid number of 14 and a water content of 0.13% by weight, and 20 grams of meta toluene di-isocyanate are mixed together and allowed to react at atmospheric pressure, a body of cellular plastic having a volume of 3.75 cubic inches is obtained. By contrast, when 30 grams of the same alkyd resin of Formula A, 20 grams of meta toluene di-isocyanate and 1 gram of zinc stearate powder are mixed together and allowed to react at atmospheric pressure, a body of foamed plastic having a volume of 9.1 cubic inches is obtained. From this it will be seen that the density of the cellular plastic material is substantially reduced when a metallic soap powder is employed even though a pigment (the metallic soap) has been added to the same quantities of the identical alkyd resin-di-isocyanate mixture.

The metallic soap powders which we have found to be effective and practical in the method and formulations of the invention are metallic soaps of fatty acids having from 12 to 20 carbon atoms. Included in this class are:

Zinc stearate
Aluminum stearate
Calcium stearate
Magnesium stearate
Magnesium hydroxy stearate
Barium stearate
Zinc laurate
Calcium oleate
Strontium stearate The proportion of the metallic soap powder employed may be varied considerably in the formulations. Thus it has been found that from 1/16 gram to 7½ grams of the selected metallic soap powder may be used for each 30 grams of the alkyd resin of the alkyd resin di-isocyanate reactant mixture.

We have also discovered that by incorporating metallic leafing powders in the alkyd-resin-polyisocyanate mixture a superior lower density cellular material of more uniform cellular formation is produced. This is set forth in our copending application Serial No. 44,993. The term "leafing powder" as herein employed refers to a material having the property of leafing when suspended in a suitable liquid vehicle and when suspended in such a vehicle and applied as a paint has the ability of forming a continuous film at the surface of the applied vehicle or paint. In one conventional method of manufacturing leafing powders, small thin pieces of the selected metal are treated in a stamping mill lubricated with a suitable lubricant such as stearic acid which coats the individual flakes as they are pounded in the mill, thereby preventing the particles from adhering when brought together under pressure. When the desired fineness has been obtained in the stamping mill the powder is screened and separated into the various grades. The powder, although now finely divided, is not suitable for incorporation in the foamed plastic materials of the invention. The powder must be polished before it will exhibit the desired leafing characteristics. This may be accomplished by charging the powder into a drum together with a lubricant such as stearic acid, the drum having irregular surfaces and being equipped with bristle brushes mounted on a central axle so as to bear lightly on the inside walls of the drum. The brushes and drum are then rotated relative to one another so that the powder flakes are rubbed by the brushes against the walls of the drum and against other flakes to be gradually smoothed and coated with a thin layer of the lubricant. After polishing, the powder is packed and stored for several weeks, it having been found that some aging is required for the best leafing action of the powder.

The metallic leafing powders or fillers which we have found to be practical and effective in the formulations of the invention include:

Aluminum leafing powder
Aluminum bronze leafing powder
Gold bronze leafing powder
Copper bronze leafing powder
Lead leafing powder
Nickel leafing powder
Stainless steel leafing powder—18:8 chromium-nickel
Silver leafing powder
Gold leafing powder
Copper leafing powder Metallic leafing powders of various finenesses may be employed. Excellent results have been obtained by using aluminum leafing powder of such fineness that not more than 2% was retained on a Number 325 sieve and by employing aluminum bronze leafing powder, gold bronze leafing powder and copper bronze leafing powder of such fineness that not more than 0.3% was retained on a Number 100 sieve. As above pointed out, the incorporation of a suitable proportion of a metallic leafing powder in the alkyd resin-di-isocyanate mixture produces a cellular plastic material having a lower density, greater physical strength and more uniform cells. For example, when 30 grams of the alkyd resin of Formula A, having an acid number of 14 and a water content of 0.31% by weight, and 20 grams of meta toluene di-isocyanate are mixed together and allowed to react at atmospheric pressure, the resultant body of cellular plastic has a volume of 3.75 cubic inches. By contrast, when 30 grams of the same alkyd resin of Formula A, 20 grams of the meta toluene di-isocyanate and 1 gram of 422 mesh aluminum lining powder are mixed together and allowed to react at atmospheric pressure, a body of foamed plastic having a volume of 9.5 cubic inches is obtained. It has also been found that an increase in the proportion of the leafing powder incorporated in the alkyd resin di-isocyanate mixture results in a further decrease in the density of the cellular plastic product. Thus when 3 grams of aluminum lining powder of Number 422 mesh are mixed with 30 grams of the same alkyd resin of Formula A and 20 grams of meta toluene di-isocyanate, the resultant cellular plastic body has a volume of 10.5 cubic inches. This is a volume increase of approximately 10% over the above recited example wherein 1 gram of the aluminum lining powder of Number 422 mesh was used with corresponding quantities of the same alkyd resin and meta toluene di-isocyanate. However, the volume increase is accompanied by a weight increase of only 4% so that there is a resultant decrease in density. The metallic leafing powders employed individually or in appropriate mixtures may be used in the proportion of from $\frac{1}{15}$ to 7½ grams for each 30 grams of the alkyd resin.

As set forth in our copending application, Serial No. 35,294, good results are obtained and a strong low density cellular plastic is produced by incorporating water in the alkyd resin di-isocyanate reactant mixture in combination with a non-ionic wetting agent. The concentration of the wetting agent in the water may range from 5% to 75% by weight. The aqueous solution is mixed with the resin component to impart an added water content of from 0.1 gram to 5 grams for each 100 grams of the resin. The following are typical of non-ionic wetting agents that are effective in producing well distributed foam creating reactions:

1. Alkylated phenoxy polyethoxy ethanol of the type structure:

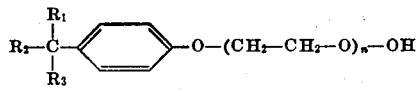

where R₁, R₂ and R₃ may be either H or CH₃ or C₂H₅ radicals and $n$ may vary from 2 through 6.

2. Polyoxy alkylene derivatives of hexitol anhydride partial long chain fatty acid esters of the type structure:

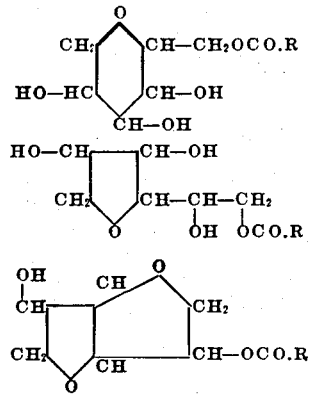

where R=the residue of a long chain fatty acid, and in which the free hydroxyls have been modified by reaction with alkylene oxide to give poly alkoxy alcohol derivatives.

3. Water-soluble hydroxylated resins, illustrated by poly-vinyl alcohol which has the type structure:

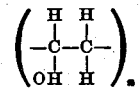

where $n$ may vary from 35 to 300.

We have also discovered that highly satisfactory results are obtained and a strong low density foamed plastic is produced by incorporating water in the formulation through the use of a metallic salt hydrate characterized by the fact that it is soluble in anhydrous ethyl alcohol at approximately 18° C. to the extent of at least 1½ grams of the salt to 100 c.c. of the solvent. The metallic salt hydrates that have been found to be practical and effective as carriers for the foam producing water component of the resin are:

Sodium acetate, $NaC_2H_3O_2.3H_2O$
Manganous chloride, $MnCl_2.4H_2O$
Cupric nitrate, $Cu(NO_3)_2.6H_2O$
Magnesium bromide, $MgBr_2.6H_2O$
Lithium salicylate, $C_6H_4OHCOOLi.1/2H_2O$ The selected metallic salt hydrate, or mixture of metallic salt hydrates, is used in the proportions to give the resin component of the reactant mixture an added water content of from 0.1 gram to 5 grams for each 100 grams of the alkyd resin.

The results obtained by employing either the non-ionic wetting agent or the metallic salt hydrate as the carrier and/or dispersant for the water component of the formulation are far superior to results obtainable by merely adding water to the resin and poly-isocyanate. For example, when a 50% aqueous solution of an alkylated phenoxy polyethoxy ethanol of the type formula:

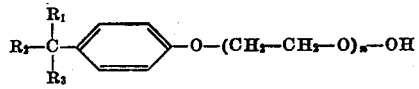

(corresponding to 0.507 gram of water) is added to 30 grams of the alkyd resin of Formula A containing 0.32% water and having an acid number of 14, and 20 grams of meta toluene di-isocyanate, a body of foamed plastic having a volume of 12 cublic inches is obtained. By contrast, when 0.507 gram of water is merely added to a mixture of 30 grams of the same resin and 20 grams of meta toluene di-isocyanate, the body of foamed plastic having a volume of only 8½ cubic inches is obtained. Similarly the addition of 1.4 grams of hydrated manganous chloride, which is equivalent to 0.507 gram of water, with 30 grams of the alkyd resin of Formula A and 20 grams of meta toluene di-isocyanate, results in a foamed plastic body having a volume of 10 cubic inches.

As mentioned above, excellent results are obtained when both a metallic soap powder and a metallic leafing powder are incorporated in the alkyd resin di-isocyanate mixture containing the fire retardant additives described below. The combination of the fillers appears to act synergystically, that is the combination of the metallic soap powder and the metallic leafing powder causes the formation of a greater volume of the cellular plastic than if the same proportionate quantity of each filler is used separately in the identical alkyd resin di-isocyanate reactant mixture. When the metallic leafing powders and the metallic soaps are both used in the formulations of the invention, the metallic leafing powder may be employed in the proportion of from 1/16 to 5 grams for each 30 grams of the alkyd resin and the metallic soaps may be used in the proportion of 1/16 to 5 grams for each 30 grams of the alkyd resin.

In accordance with the present invention, the foamed or cellular plastic products are made flame resistant and self-extinguishing, when once ignited, by incorporating flame retardant additives in the alkyd resin di-isocyanate mixture containing the metallic soap powder, or the metallic leafing powder, or both the metallic leafing powder and the metallic soap powder, or the metallic salt hydrate or the non-ionic wetting agent-water solution. It is to be understood that the flame retardant additives may, if desired, be employed in the alkyd resin-di-isocyanate mixture containing an appropriate proportion of the foaming component water. The additives which we have found to be effective in rendering the cellular material flame resistant and in performing important functions during the mixing, handling and reacting of the mixture, are unsaturated alkyl esters of aryl phosphonic acids, namely compounds having the general formula $ArPO(OCH_2CR:CHR^1)_2$ where Ar represents aryl and alkaryl hydrocarbon radicals and R and $R^1$ are hydrogen and alkyl hydrocarbon radicals. Compounds of this general nature are described in United States Letters Patent No. 2,425,765 granted August 19, 1947. Included in this group of compounds are:

1. Diallyl phenyl phosphonate

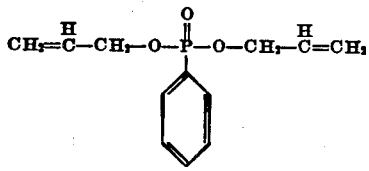

2. Bis (methallyl) benzenephosphonate

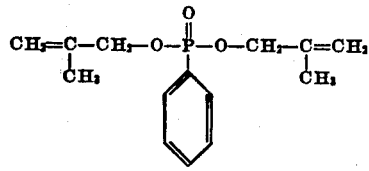

and,

3. Diallyl toluene phosphonate

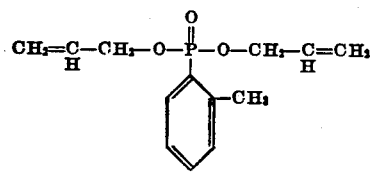

These additives employed in the alkyd resin di-isocyanate and filler or water component mixture, serve to impart flame resistant and decreased flame propagation characteristics to the cellular plastic product. Furthermore, the additives materially decrease the density of the foamed plastic materials. While we do not wish to be understood as limiting the invention to any particular theory, it appears that this result, the increase in volume of the cellular plastic material by incorporating the fire retardant additives in the reactant mixture, may be caused by a combination of effects such as (1) through a plasti- cizing action during the foaming of the reactants which may increase the period during which the alkyd resin di-isocyanate reaction product can be distorted, thereby utilizing the liberated gas more efficiently and (2) through a decrease in the viscosity of the plastic mixture so that less energy is required in displacing the plastic. In addition to the unusual density reducing action of the fire retardants, they are further unusual in that they do not have to remain as permanent plasticizers in the foamed or cellular plastic product. By adding an appropriate proportion of a peroxide-type catalyst, such as benzoyl peroxide, to the liquid additives, they may be hardened or polymerized during the foaming reaction and post-curing of the mixture without losing their effectiveness as flame-proofing agents. This phenomenon or characteristic is advantageous because the benefits of plasticization and viscosity control to obtain a lower density product may be utilized during the foaming of the mixture without the penalty of decreased heat stability of the foamed plastic product due to permanent plasticization.

The proportion or quantity of the selected fire retardant and flame-proofing additive employed in the alkyd resin di-isocyante reactant mixture may be varied considerably and in practice from 1 gram to 20 grams of the additive may be used with each 30 grams of the alkyd resin. However, it is usually preferred to employ approximately 5 grams of the additive for each 30 grams of the alkyd resin.

The following comparison illustrates the effectiveness of a flame-proofing agent or additive of the class above described in lowering the density of the cellular plastic material. When 30 grams of the alkyd resin of Formula A, having an acid number of 14 and a water content of 0.36% by weight, 20 grams of meta toluene di-isocyanate, and 1 gram of Number 422 mesh aluminum leafing powder are mixed together and allowed to react at atmospheric pressure, a flammable plastic material having a density of approximately 22 pounds per cubic foot is produced. On the other hand, when 30 grams of the alkyd resin of Formula A, having an acid number of 14 and a water content of 0.36% by weight, 20 grams of meta toluene di-isocyanate, 1 gram of Number 422 mesh aluminum leafing powder and 5 grams of diallyl phenyl phosphonate, and ¼ gram of benzoyl peroxide are mixed and allowed to react at atmospheric pressure, a self-extinguishing foamed plastic product having a density of 11.9 pounds per cubic foot is produced. Owing to the fact that the 5 grams of the additive have been incorporated in the same mixture, it would be expected that the resultant product would have an increased density. However, from the foregoing it will be seen that the inclusion of the flame and fire retardant additive actually lowers the density of the cellular product to a substantial degree.

If desired, other flame-proofing and fire retardant agents may be used together with, or in addition to the unsaturated alkyl esters of aryl phosphonic acids described above. Such fire retardant and flame-proofing agents include tri chloralkyl phosphates of the general formula

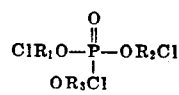

where $R_1$, $R_2$ and $R_3$ are alkyl groups having from 2 to 4 carbon atoms, antimony oxide $Sb_2O_3$ and unsaturated alkyl esters of alkenyl phosphonic acids of the type described in United States Letters Patent No. 2,425,766 granted August 19, 1947, namely compounds having the general formula $R^2R^3C:CR^4PO(OCH_2CR:CHR^1)_2$ where R, $R^1$ and $R^4$ are hydrogen or alkyl, and $R^2$ and $R^3$ are hydrogen, alkyl or aryl radicals.

Examples of the tri chloralkyl phosphates which we have found to be effective in the formulations of the invention are:

Tri-B-chloroethyl phosphate

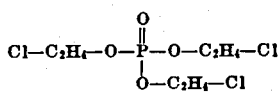

and

Trichloropropyl phosphate $$(Cl-C_3H_7-O)_3-PO$$

Examples of the unsaturated alkyl esters of alkenyl phosphoric acids which we have found to be practical and effective in the cellular plastic formulations are:

Diallyl isobutene phosphonate

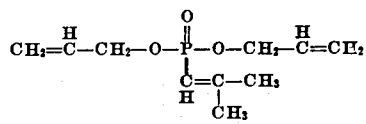

Diallyl styrene phosphonate

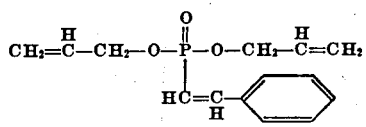

and

Bis (methallyl) styrene phosphonate

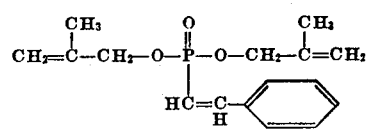

The unsaturated alkyl esters of aryl phosphonic acids, the unsaturated alkyl esters of alkenyl phosphonic acids and the tri chloroalkyl phosphates serve to facilitate mixing of the alkyd resin and the di-isocyanate by acting as mutual solvents for both the alkyd resin and the meta toluene di-isocyanate which tends to avoid premature reaction, prior to pouring due to long mixing time. This is important as it permits the utilization of higher water content alkyd resins which, in turn can result in a lowered density of the foamed plastic product. The antimony oxide, in addition to serving as a flame-proofing agent, acts as a cell size regulator whereby the cells of the foamed plactic are of smaller size. The unsaturated alkyl esters of alkenyl phosphonic acids may be used in the proportion of from 1 to 20 grams for each 30 grams of the alkyd resin when employed with or without the unsaturated alkyl esters of aryl phosphonic acids in the proportion above named. The tri chloralkyl phosphates may be used in the proportion of from ½ to 10 grams for each 30 grams of the alkyd resin and when used with the unsaturated alkyl esters of aryl phosphonic acids in the proportion above set forth, may be used in the proportion of ½ to 7½ grams for each 30 grams of alkyd resin. The antimony oxide may be employed in the proportion of from ¼ to 5 grams for each 30 grams of the alkyd resin with or without the addition of the unsaturated alkyl esters of aryl phosphonic acid or the tri chloralkyl phosphates.

The following are typical examples of the formulations of the invention which are productive of substantially flame-proof and flame retardant cellular plastic materials of low density and generaly uniform cell structure.

*Example 1*

| | Grams |
|---|---|
| Alkyd resin of Formula A having an acid number of 14 and a water content of 0.31% by weight | 30 |
| Meta toluene di-isocyanate | 20 |
| Zinc stearate powder | ½ |
| Diallyl phenyl phosphonate | 5 |

In the formulation of Example 1 from 10 to 40 grams of the meta toluene di-isocyanate, from ⅟₁₆ to 7½ grams of the zinc stearate powder and from 1 to 20 grams of dialyl phenyl phosphonate may be used with each 30 grams of the alkyd resin.

*Example 2*

| | Grams |
|---|---|
| Alkyd resin of Formula A having an acid number of 14 and a water content of 0.31% by weight | 30 |
| Meta toluene di-isocyanate | 20 |
| Aluminum stearate powder | 1 |
| Tri-B-chlorethyl phosphate | 2½ |

In this formulation from 10 to 40 grams of the meta toluene di-isocyanate, from ⅟₁₆ to 7½ grams of the aluminum stearate powder and from ½ to 10 grams of tri-B-chlorethyl phosphate may be used with each 30 grams of the alkyd resin.

*Example 3*

| | Grams |
|---|---|
| Alkyd resin of Formula A having an acid number of 14 and a water content of 0.31% by weight | 30 |
| Meta toluene di-isocyanate | 20 |
| Magnesium hydroxy stearate powder | from ⅟₁₆ to 7½ |
| Diallyl phenyl phosphonate | from 1 to 20 |
| Tri-B-chlorethyl phosphate | from ½ to 7½ |

*Example 4*

| | Grams |
|---|---|
| Alkyd resin of Formula A having an acid number of 14 and a water content of 2.14% by weight | 30 |
| Meta toluene di-isocyanate | 23 |
| Zinc stearate powder | 1 |
| Antimony oxide powder | 2½ |

In Example 4 from 15 to 45 grams of the meta toluene di-isocyanate, from ⅟₁₆ to 7½ grams of the zinc stearate powder and from ¼ to 5 grams of powdered antimony oxide may be used with each 30 grams of the alkyd resin.

*Example 5*

| | Grams |
|---|---|
| Alkyd resin of Formula A having an acid number of 14 and a water content of 0.56% by weight | 30 |
| Meta toluene di-isocyanate | 20 |
| Zinc stearate powder | 1 |
| Diallyl phenyl phosphonate | 5 |
| Benzoyl peroxide | ¼ |

From 10 to 40 grams of the meta toluene di-isocyanate, from ⅟₁₆ to 7½ grams of the zinc stearate and from 1 to 20 grams of diallyl phenyl phosphonate may be used with each 30 grams of the alkyd resin in Example 5. The benzoyl peroxide as employed in this and other formulations of the invention is preferably pre-dissolved in the flame retardant additive and its proportion is preferably constant at 5% by weight of the unsaturated alkyl esters of the aryl phosphonic acids or of the alkenyl phosphonic acids.

Example 6

| | Grams |
|---|---|
| Alkyd resin of Formula A having an acid number of 34 and a water content of 1.4% by weight | 30 |
| Meta toluene di-isocyanate | 20 |
| Barium stearate | 2 |
| Diallyl phenyl phosphonate | 3 |
| Benzoyl peroxide | ¼ |
| Powdered antimony oxide | 1½ |

In Example 6 from 12½ to 42½ grams of the meta toluene di-isocyanate, from ⅛ to 7½ grams of the barium stearate, from 1 to 20 grams of diallyl phenyl phosphonate, and from ¼ to 5 grams of powdered antimony oxide may be used with each 30 grams of the alkyd resin.

Example 7

| | Grams |
|---|---|
| Alkyd resin of Formula A having an acid number of 14 and a water content of 0.56 by weight | 30 |
| Meta toluene di-isocyanate | 20 |
| Zinc stearate powder | ¾ |
| Calcium stearate powder | ¼ |
| Tri-B-chlorethyl phosphate | 1¼ |
| Powdered antimony oxide | 1¼ |

It will be observed that in Example 7 a mixture or combination of metallic soaps is employed in the formulation. In this example, from ½ to 7½ grams of tri-B-chlorethyl phosphate and from ¼ to 5 grams of powdered antimony oxide may be used with each 30 grams of the alkyd resin.

Example 8

| | Grams |
|---|---|
| Alkyd resin of Formula A having an acid number of 34 and a water content of 1.4% by weight | 30 |
| Meta toluene di-isocyanate | 22½ |
| Number 422 mesh aluminum leafing powder | 1½ |
| Diallyl phenyl phosphonate | 3 |
| Benzoyl peroxide | 0.15 |

In this formulation from 12½ to 40 grams of the meta toluene di-isocyanate, from ⅛ to 7½ grams of the aluminum leafing powder and from 1 to 20 grams of diallyl phenyl phosphonate may be used with each 30 grams of the resin.

Example 9

| | Grams |
|---|---|
| Alkyd resin of Formula A having an acid number of 14 and a water content of 2.2% by weight | 30 |
| Meta toluene di-isocyanate | 25 |
| Number 422 mesh aluminum leafing powder | 5 |
| Diallyl toluene phosphonate | 5 |
| Benzoyl peroxide | ¼ |

In this formulation from 15 to 40 grams of the meta toluene di-isocyanate, from ⅛ to 7½ grams of the aluminum leafing powder and from 1 to 20 grams of the diallyl toluene phosphonate may be used with each 30 grams of the alkyd resin.

Example 10

| | Grams |
|---|---|
| Alkyd resin of Formula A having an acid number of 10 and a water content of 0.15% by weight | 30 |
| Meta toluene di-isocyanate | 15 |
| Copper lining powder | 1 |
| Bis (methallyl) benzene phosphonate | 7½ |

In this formulation from 10 to 30 grams of meta toluene di-isocyanate, from ⅛ to 7½ grams of the copper lining powder and from 1 to 20 grams of the bis (methallyl) benzene phosphonate may be used with each 30 grams of the alkyd resin.

Example 11

| | Grams |
|---|---|
| Alkyd resin of Formula A having an acid number of 16 and a water content of 0.56% by weight | 30 |
| Meta toluene di-isocyanate | 20 |
| Copper lining powder | ½ |
| Aluminum leafing powder (preferably Number 422 mesh) | 1 |
| Diallyl phenyl phosphonate | 4 |
| Benzoyl peroxide | 0.2 |

In this formulation from 10 to 40 grams of the meta toluene di-isocyanate, from ⅛ to 7½ grams (total) of the mixture of metallic leafing powders, and from 1 to 20 grams of the diallyl phenyl phosphonate may be used with each 30 grams of the alkyd resin.

Example 13

| | Grams |
|---|---|
| Alkyd resin of Formula A having an acid number of 14 and a water content of 0.13% by weight | 30 |
| Meta toluene di-isocyanate | 20 |
| Number 422 mesh aluminum leafing powder | ½ |
| Zinc stearate powder | ½ |
| Diallyl phenyl phosphonate | 7½ |
| Benzoyl peroxide | 0.375 |

The metallic leafing powder may be employed in this formulation in the proportion of from ⅛ to 5 grams for each 30 grams of the alkyd resin, from ⅛ to 5 grams of the metallic soap may be used with each 30 grams of the resin, and from 1 to 20 grams of the diallyl phenyl phosphonate may be employed with each 30 grams of the resin.

Example 12

| | Grams |
|---|---|
| Alkyd resin of Formula A having an acid number of 20 and a water content of 0.35% by weight | 30 |
| Meta toluene di-isocyanate | 20 |
| Strontium stearate powder | 0.75 |
| Number 422 mesh aluminum leafing powder | 0.75 |
| Diallyl isobutene phosphonate | 5 |

In the formulation of Example 13 from 10 to 40 grams of the meta toluene di-isocyanate, from ⅛ to 5 grams of each of the aluminum leafing powder and the strontium stearate powder, and from 1 to 20 grams of the diallyl isobutene phosphonate may be used with each 30 grams of the alkyd resin.

Example 14

| | Grams |
|---|---|
| Alkyd resin of Formula A having an acid number of 14 and a water content of 0.53% by weight | 30 |
| Meta toluene di-isocyanate | 20 |
| Number 422 mesh aluminum leafing powder | 1 |
| Zinc stearate powder | ¼ |
| Diallyl phenyl phosphonate | 5 |
| Benzoyl peroxide | 0.25 |

In Example 14 from 10 to 40 grams of the meta toluene di-isocyanate, from 1/16 to 5 grams of the aluminum leafing powder, from 1/16 to 5 grams of the zinc stearate powder, and from 1 to 20 grams of the diallyl phenyl phosphonate may be used with each 30 grams of the alkyd resin.

Example 15

| | Grams |
|---|---|
| Alkyd resin of Formula C having an acid number of 30 and a water content of 0.75% by weight | 30 |
| Meta toluene di-isocyanate | 20 |
| Zinc stearate powder | 1 |
| Diallyl phenyl phosphonate | 5 |
| Benzoyl peroxide | 1/4 |

In this formulation from 10 to 40 grams of meta toluene di-isocyanate, from 1 to 20 grams of diallyl phenyl phosphonate and from 1/16 to 7 1/2 grams of zinc stearate powder may be used with each 30 grams of the alkyd resin.

Example 16

| | Grams |
|---|---|
| Alkyd resin of Formula C having an acid number of 20 and a water content of 0.85% by weight | 30 |
| Meta toluene di-isocyanate | 20 |
| Number 422 mesh aluminum leafing powder | 1/4 |
| Zinc stearate powder | 1 |
| Diallyl phenyl phosphonate | 5 |
| Benzoyl peroxide | 1/4 |

In Example 16 from 10 to 40 grams of meta toluene di-isocyanate, from 1/16 to 5 grams of aluminum leafing powder, from 1/16 to 5 grams of zinc stearate powder and from 1 to 20 grams of diallyl phenyl phosphonate may be used with each 30 grams of the alkyd resin.

Example 17

| | Grams |
|---|---|
| Alkyd resin of Formula A having an acid number of 14 and a water content of 0.32% by weight | 30 |
| Meta toluene di-isocyanate | 20 |
| 50% by weight aqueous solution of an alkylated phenoxy polyethoxy ethanol of the type structure: | |

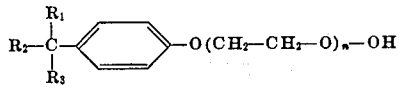

where $R_1$, $R_2$ and $R_3$ are either H or $CH_3$, or $C_2H_5$ radicals, and where $n$ may vary from 2 through 6 — 1.014
Diallyl phenyl phosphonate — 5
Benzoyl peroxide — 0.25

Example 18

| | Grams |
|---|---|
| Alkyd resin of Formula A having an acid number of 14 and a water content of 0.32% by weight | 30 |
| Meta Toluene di-isocyanate | 20 |
| Hydrated manganous chloride | 1.40 |
| Diallyl phenyl phosphonate | 5 |
| Benzoyl peroxide | 0.25 |

Example 19

| | Grams |
|---|---|
| Alkyd resin of Formula A having an acid number of 14 and a water content of 0.32% by weight | 30 |
| Meta toluene di-isocyanate | 20 |
| 10% by weight aqueous solution of a polyvinyl alcohol resin of the type structure: | |

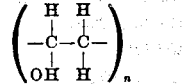

where $n$ may vary from 35 to 300 — 0.564

| | Grams |
|---|---|
| Diallyl phenyl phosphonate | 5 |
| Benzoyl peroxide | 0.25 |

The physical properties of the cellular plastic material produced by the method of the invention depend upon the nature of the alkyd resin employed in the formulations. For example, when the resins of Formulae A, C and F are reacted with the meta toluene di-isocyanate and the other ingredients of the mixtures, strong, rigid cellular plastics result. When the alkyd resins of Formulae B, E, H and K are employed, the resultant foamed or cellular plastics are less rigid and when the resins of Formulae I and J are employed in the reactant mixtures, the resultant foamed plastics approach a rubbery state.

In preparing the cellular plastic materials of the invention, the alkyd resins, the meta toluene di-isocyanate, the fire retardant additives, the metallic soap powder or the leafing powder or the metallic salt hydrate or the aqueous solution containing the nonionic wetting agent are thoroughly mixed in the ratio designed to produce the foamed plastic having the desired density, etc. This mixture is then poured into the mold or cavity in the structure in which it is to form a part or is applied to the desired surface and is allowed to react at atmospheric pressure either with or without the application of external heat, or attended by moderate heating of say between 120° F. and 150° F. depending upon the size of the batch. The mixture is simply allowed to react and the reaction is permitted to go on to completion to produce the cellular product. A post-curing operation of from 10 to 20 hours at a temperature of from 125° F. to 225° F. may be desirable to continue the polymerization of the reaction and thus produce a more heat stable and more solvent resistant cellular material. The foamed or cellular plastic material produced by the method is substantially uniform throughout in its cellular structure, having generally spherical and sometimes elongated, non-communicating cells of like size. The material is physically strong, of low density, and has excellent thermal insulating properties.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissable in view of the prior art.

We claim:

1. The method of making flame retardant cellular plastic material which comprises reacting an alkyd resin wherein the hydroxyl and carboxyl groups in the alkyd resin reactants are in the ratio range of from 3(OH):1(COOH) to 4(OH):5(COOH) and wherein the water content is from 0.1% to 2.5% by weight, meta toluene di-isocyanate and an unsaturated alkyl ester of aryl phosphonic acids of the general formula $ArPO(OCH_2CR:CHR^1)_2$ where Ar represents a radical selected from the group consisting of aryl and alkaryl hydrocarbon radicals and where R and $R^1$ represent radicals selected from the group consisting of H and alkyl hydrocarbon radicals, the reactants of said material being in the proportion of from 35 to 150 parts by weight of the meta toluene di-isocyanate and from 3.33 to 66.6 parts by weight of said unsaturated alkyl ester to 100 parts by weight of said alkyd resin.

2. The flame retardant cellular plastic material which comprises the reacting product of an alkyd resin wherein the hydroxyl and carboxyl groups in the alkyd resin reactants are in the ratio range of from 3(OH):1(COOH) to 4(OH):5(COOH) and wherein the water content is from 0.1% to 2.5% by weight, meta toluene di-isocyanate and diallyl phenyl phosphonate in the proportion of from 35 to 150 parts by weight of the meta toluene di-isocyanate and from 3.33 to 66.6 parts by weight of diallyl phenyl phosphonate to 100 parts by weight of said resin.

3. The flame retardant cellular plastic material which comprises the reaction product of an alkyd resin wherein the hydroxyl and carboxyl groups in the alkyd resin reactants are in the ratio range of from 3(OH):1(COOH) to 4(OH):5(COOH) and wherein the water content is from 0.1% to 2.5% by weight, meta toluene di-isocyanate and bis (methallyl) benzenephosphonate in the proportion of from 35 to 150 parts by weight of the meta toluene di-isocyanate and from 3.33 to 66.6 parts by weight of the bis (methallyl) benzenephosphonate to 100 parts by weight of said resin.

4. A flame retardant cellular plastic material comprising the reaction product of an alkyd resin wherein the hydroxyl and carboxyl groups in the alkyd resin reactants are in the ratio range of from 3(OH):1(COOH) to 4(OH):5(COOH) and wherein the water content is from 0.1% to 2.5% by weight, meta toluene di-isocyanate and diallyl toluene phosphonate in the proportion of from 35 to 150 parts by weight of the meta toluene di-isocyanate and from 3.33 to 66.6 parts by weight of the diallyl toluene phosphonate to 100 parts by weight of said resin.

5. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.21 to 25 parts by weight to 100 parts by weight of said resin of a metallic soap powder chosen from the group consisting of:

Zinc stearate
Aluminum stearate
Calcium stearate
Magnesium stearate
Magnesium hydroxy stearate
Barium stearate
Zinc laurate
Calcium oleate
Strontium stearate and from 3.33 to 66.6 parts by weight for each 100 parts by weight of said resin of an unsaturated alkyl ester of aryl phosphonic acids of the general formula $ArPO(OCH_2CR:CHR^1)_2$ where Ar represents a radical selected from the group consisting of aryl and alkaryl hydrocarbon radicals and where R and $R^1$ represent radicals selected from the group consisting of H and alkyl hydrocarbon radicals.

6. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.21 to 25 parts by weight to 100 parts by weight of said resin of a metallic soap powder chosen from the group consisting of:

Zinc stearate
Aluminum stearate
Calcium stearate
Magnesium stearate
Magnesium hydroxy stearate
Barium stearate
Zinc laurate
Calcium oleate
Strontium stearate and from 3.33 to 66.6 parts by weight of diallyl phenyl phosphonate for each 100 parts by weight of said resin.

7. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.21 to 25 parts by weight to 100 parts by weight of said resin of a metallic soap powder chosen from the group consisting of:

Zinc stearte
Aluminum stearate
Calcium stearate
Magnesium stearate
Magnesium hydroxy stearate
Barium stearate
Zinc laurate
Calcium oleate
Strontium stearate and from 3.33 to 66.6 parts by weight of bis (methallyl) benzene-phosphonate for each 100 parts by weight of said resin.

8. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.21 to 25 parts by weight to 100 parts by weight of said resin of a metallic soap powder chosen from the group consisting of:

Zinc stearate
Aluminum stearate
Calcium stearate
Magnesium stearate
Magnesium hydroxy stearate
Barium stearate
Zinc laurate
Calcium oleate
Strontium stearate and from 3.33 to 66.6 parts by weight of diallyl toluene phosphonate for each 100 parts by weight of said resin.

9. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.4 to 25 parts by weight to 100 parts by weight of said resin of a metallic leafing powder chosen from the group consisting of:

Aluminum leafing powder
    Aluminum bronze leafing powder
    Gold bronze leafing powder
    Copper bronze leafing powder
    Lead leafing powder
    Nickel leafing powder
    Silver leafing powder
    Gold leafing powder
    Copper leafing powder
    Stainless steel leafing powder and from 3.33 to 66.6 parts by weight for each 100 parts by weight of said resin of an unsaturated alkyl ester of aryl phosphonic acids of the general formula $ArPO(OCH_2CR:CHR^1)_2$ where Ar represents a radical selected from the group consisting of aryl and alkaryl hydrocarbon radicals and R and $R^1$ represent radicals selected from the group consisting of H and alkyl hydrocarbon radicals.

10. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.4 to 25 parts by weight to 100 parts by weight of said resin of a metallic leafing powder chosen from the group consisting of:

Aluminum leafing powder
    Aluminum bronze leafing powder
    Gold bronze leafing powder
    Copper bronze leafing powder
    Lead leafing powder
    Nickel leafing powder
    Silver leafing powder
    Gold leafing powder
    Copper leafing powder
    Stainless steel leafing powder and from 3.33 to 66.6 parts by weight of diallyl phenyl phosphonate for each 100 parts by weight of said resin.

11. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.4 to 25 parts by weight to 100 parts by weight of said resin of a metallic leafing powder chosen from the group consisting of:

Aluminum leafing powder
    Aluminum bronze leafing powder
    Gold bronze leafing powder
    Copper bronze leafing powder
    Lead leafing powder
    Nickel leafing powder
    Silver leafing powder
    Gold leafing powder
    Copper leafing powder
    Stainless steel leafing powder and from 3.33 to 66.6 parts by weight of bis (methallyl) benzene-phosphonate for each 100 parts by weight of said resin.

12. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.4 to 25 parts by weight to 100 parts by weight of said resin of a metallic leafing powder chosen from the group consisting of:

Aluminum leafing powder
    Aluminum bronze leafing powder
    Gold bronze leafing powder
    Copper bronze leafing powder
    Lead leafing powder
    Nickel leafing powder
    Silver leafing powder
    Gold leafing powder
    Copper leafing powder
    Stainless steel leafing powder and from 3.33 to 66.6 parts by weight of diallyl toluene phosphonate for each 100 parts by weight of said resin.

13. A flame retardant cellular plastic material comprising the reaction product of an alkyd resin having an acid number of from 5 to 80 and a water content of from 0.1% to 2.5% by weight and wherein the hydroxyl and carboxyl groups of the alkyd resin reactants are in the ratio of from 3(OH):1(COOH) to 4(OH):5(COOH), from 35 to 150 parts by weight of meta toluene di-isocyanate for each 100 parts by weight of said resin, from 0.21 to 16.5 parts by weight to 100 parts by weight of said resin of a metallic soap powder chosen from the group consisting of:

Zinc stearate
    Aluminum stearate
    Calcium stearate
    Magnesium stearate
    Magnesium hydroxy stearate
    Barium stearate
    Zinc laurate
    Calcium oleate
    Strontium stearate from 0.21 to 16.5 parts by weight of a metallic leafing powder chosen from the group consisting of:

Aluminum leafing powder
    Aluminum bronze leafing powder
    Gold bronze leafing powder
    Copper bronze leafing powder
    Lead leafing powder
    Nickel leafing powder
    Silver leafing powder
    Gold leafing powder
    Copper leafing powder
    Stainless steel leafing powder and from 3.33 to 66.6 parts by weight for each 100 parts by weight of said resin of an unsaturated alkyl ester of aryl phosphonic acid of the general formula $ArPO(OCH_2CR{:}CHR^1)_2$ where Ar represents a radical selected from the group consisting of aryl and alkaryl hydrocarbon radicals and where R and $R^1$ represent radicals selected from the group consisting of H and alkyl hydrocarbon radicals.

14. A flame retardant cellular plastic material comprising the reaction product of an alkyd resin having an acid number of from 5 to 80 and a water content of from 0.1 to 2.5% by weight and wherein the hydroxyl and carboxyl groups of the alkyd resin reactants are in the ratio range of from 3(OH):1(COOH) to 4(OH):5(COOH), from 35 to 150 parts by weight of meta toluene di-isocyanate for each 100 parts by weight of said resin, a sufficient quantity of a metallic salt hydrate chosen from the group consisting of:

Sodium acetate
Manganous chloride
Cupric nitrate
Magnesium bromide
Lithium salicylate to add from 0.1 gram to 5 grams of water for each 100 grams of the resin, and from 3.33 to 66.6 parts by weight for each 100 parts by weight of said resin of an unsaturated alkyl ester of aryl phosphonic acid of the general formula $ArPO(OCH_2CR{:}CHR^1)_2$ where Ar represents a radical selected from the group consisting of aryl and alkaryl hydrocarbon radicals and where R and $R^1$ represent radicals selected from the group consisting of H and alkyl hydrocarbon radicals.

15. A flame retardant cellular plastic material comprising the reaction product of an alkyd resin having an acid number of from 5 to 80 and a water content of from 0.1 to 2.5% by weight and wherein the hydroxyl and carboxyl groups of the alkyd resin reactants are in the ratio range of from 3(OH):1(COOH) to 4(OH):5(COOH), from 35 to 150 parts by weight of meta toluene di-isocyanate for each 100 parts by weight of said resin, a sufficient quantity of 5 to 75% by weight aqueous solution of a non-ionic wetting agent to increase the water content of the resin by from 0.1 to 5.0 grams of water for each 100 grams of the resin, and from 3.33 to 66.6 parts by weight of said resin of an unsaturated alkyl ester of an aryl phosphonic acid of the general formula $ArPO(OCH_2CR{:}CHR^1)_2$ where Ar represents a radical selected from the group consisting of aryl and alkaryl hydrocarbon radicals and where R and $R^1$ represent radicals selected from the group consisting of H and alkyl hydrocarbon radicals.

16. The method of producing flame retardant cellular plastic which comprises reacting an alkyd resin having an acid number of from 5 to 80 and a water content of from 0.1 to 2.5% by weight namely the reaction product of from 3 to 5 mols of glycerol, from 1.5 to 3 mols adipic acid and from 0.1 to 1.5 mols phthalic anhydride, meta toluene di-isocyanate and diallyl phenyl phosphonate in the approximate proportion of from 10 to 40 grams of the meta toluene di-isocyanate and from 1 to 20 grams of the diallyl phenyl phosphonate for each 30 grams of the resin.

17. A flame retardant cellular plastic comprising the reaction product of the following constituents on an approximate weight basis 30 grams of an alkyd resin having an acid number of from 5 to 80 and a water content of from 0.1 to 2.5% by weight namely the reaction product of from 3 to 5 mols glycerol, from 1.5 to 3 mols adipic acid and from 0.1 to 1.5 mols phthalic anhydride, from 10 to 40 grams of meta toluene di-isocyanate, and from 1 to 20 grams of diallyl phenyl phosphonate.

18. A flame retardant cellular plastic comprising the reaction product of the following constituents on an approximate weight basis 30 grams of an alkyd resin having an acid number of from 5 to 80 and a water content of from 0.1 to 2.5% by weight namely the reaction product of from 3 to 5 mols glycerol, from 1.5 to 3 mols adipic acid and from 0.1 to 1.5 mols phthalic anhydride, from 10 to 30 grams of meta toluene di-isocyanate, from $\frac{1}{8}$ to 7½ grams of a metallic soap powder selected from the group consisting of:

Zinc stearate
Aluminum stearate
Calcium stearate
Magnesium stearate
Magnesium hydroxy stearate
Barium stearate
Zinc laurate
Calcium oleate
Strontium stearate and from 1 to 20 grams of diallyl phenyl phosphonate.

19. A flame retardant cellular plastic material comprising the reaction product of the following constituents on an approximate weight basis 30 grams of an alkyd resin wherein the ratio of the hydroxyl groups to the carboxyl groups of the alkyd resin reactants is 2(OH):1(COOH) namely the reaction product of 4 mols trimethylol propane, 2.5 mols adipic acid and 0.5 mol phthalic anhydride; the alkyd resin having a water content of from 0.1% to 2.5% by weight, from 10 to 40 grams meta toluene di-isocyanate, from 1 to 20 grams diallyl phenyl phosphonate and from $\frac{1}{8}$ to 7½ grams zinc stearate.

20. A flame retardant cellular plastic material comprising the reaction product of the following constituents on an approximate weight basis 30 grams of an alkyd resin wherein the ratio of the hydroxyl groups to the carboxyl groups of the alkyd resin reactants is 2(OH):1(COOH) namely the reaction product of 4 mols trimethylol propane, 2.5 mols adipic acid and 0.5 mol phthalic anhydride; the alkyd resin having a water content of from 0.1% to 2.5% by weight, 20 grams meta toluene di-isocyanate, 1 gram zinc stearate powder, 5 grams diallyl phenyl phosphonate, and ¼ gram benzoyl peroxide.

21. A flame retardant cellular plastic material comprising the reaction product of the following constituents on an approximate weight basis 30 grams of an alkyd resin wherein the ratio of the hydroxyl groups to the carboxyl groups of the alkyd resin reactants is 2(OH):1(COOH) namely the reaction product of 4 mols glycerol, 2.5 mols adipic acid and 0.5 mol phthalic anhydride, said resin having an acid number of from 5 to 80 and a water content of from 0.1% to 2.5% by weight; 20 grams meta toluene di-isocyanate, 1 gram aluminum stearate powder, and 2.5 grams tri-B-chlorethyl phosphate.

22. A flame retardant cellular plastic material comprising the reaction product of the following constituents on an approximate weight basis 30 grams of an alkyd resin wherein the ratio of the hydroxyl groups to the carboxyl groups of the alkyd resin reactants is 2(OH):1(COOH) namely the reaction product of 4 mols glycerol, 2.5 mols adipic acid and 0.5 mol phthalic anhydride, said resin having an acid number of from 5 to 80 and a water content of from 0.1% to 2.5% by weight, 20 grams meta toluene di-isocyanate, from $\frac{1}{8}$ to 7½ grams magnesium hydroxy stearate powder, from 1 to 20 grams diallyl phenyl phosphonate, and from 1 to 5 grams tri-B-chlorethyl phosphate.

23. A flame retardant cellular plastic material comprising the reaction product of the following constituents on an approximate weight basis 30 grams of an alkyd resin wherein the ratio of the hydroxyl groups to the carboxyl groups of the alkyd resin reactants is 2(OH):1(COOH) namely the reaction product of 4 mols glycerol, 2.5 mols adipic acid and 0.5 mol phthalic anhydride, said resin having an acid number of from 5 to 80 and a water content of from 0.1% to 2.5% by weight, 25 grams meta toluene di-isocyanate, 5 grams aluminum leafing powder, 5 grams diallyl toluene phosphonate, and ¼ gram benzoyl peroxide.

24. A flame retardant cellular plastic material comprising the reaction product of the following constituents on an approximate weight basis 30 grams of an alkyd resin wherein the ratio of the hydroxyl groups to the carboxyl groups of the alkyd resin reactants is 2(OH):1(COOH) namely the reaction product of 4 mols glycerol, 2.5 mols adipic acid and 0.5 mol phthalic anhydride, said resin having an acid number of from 5 to 80 and a water content of from 0.1% to 2.5% by weight, 15 grams meta toluene di-isocyanate, 1 gram metallic leafing powder, and 7½ grams bis (methallyl) benzene phosphonate.

25. A flame retardant cellular plastic material comprising the reaction product of the following constituents on an approximate weight basis 30 grams of an alkyd resin wherein the ratio of the hydroxyl groups to the carboxyl groups of the alkyd resin reactants is 2(OH):1(COOH) namely the reaction product of 4 mols glycerol, 2.5 mols adipic acid and 0.5 mol phthalic anhydride, said resin having an acid number of from 5 to 80 and a water content of from 0.1% to 2.5% by weight, 1.40 grams hydrated manganeous chloride, 5 grams diallyl phenyl phosphonate and ¼ gram benzoyl peroxide.

ELI SIMON.
FRANK W. THOMAS.

REFERENCES CITED

The following references are of record in the file of this patent:

UNITED STATES PATENTS

| Number | Name | Date |
|---|---|---|
| 2,268,160 | Miles | Dec. 10, 1941 |
| 2,374,136 | Rothrock | Apr. 17, 1945 |
| 2,425,765 | Toy | Aug. 19, 1947 |
| 2,461,761 | Nye | Feb. 15, 1949 |

OTHER REFERENCES

German Plastics Practice by De Bell et al., 1946. Pages 300, 301, 310 to 316 and 463 to 465.